United States Patent [19]
Best

[11] Patent Number: 5,634,578
[45] Date of Patent: Jun. 3, 1997

[54] LOAD CLAMP FOR BICYCLE RACK

[76] Inventor: Paul S. Best, 76 Manor St., Hamden, Conn. 06514

[21] Appl. No.: 562,541

[22] Filed: Nov. 20, 1995

Related U.S. Application Data

[63] Continuation of Ser. No. 307,144, Sep. 16, 1994, abandoned.
[51] Int. Cl.⁶ ........................................................ B62J 7/00
[52] U.S. Cl. .......................... 224/456; 224/462; 224/452
[58] Field of Search ................................. 224/412, 428, 224/451, 452, 453, 454, 456, 459, 462, 30 R, 32 R, 32 A, 33 R, 37, 38, 39, 40

[56] References Cited

U.S. PATENT DOCUMENTS 2,880,919  4/1959  Persons et al. ........................ 224/456

FOREIGN PATENT DOCUMENTS

| 185689 | 5/1956 | Austria | 224/39 R |
|---|---|---|---|
| 1388065 | 4/1902 | France | 224/37 |
| 574368 | 6/1924 | France | 224/30 R |
| 919768 | 3/1947 | France | 224/32 A |
| 961113 | 5/1950 | France | 224/32 A |
| 273841 | 2/1951 | France | 224/32 A |
| 1550504 | 12/1968 | France | 224/38 |
| 846069 | 6/1952 | Germany | 224/39 |
| 932771 | 8/1955 | Germany | 224/37 |
| 2004 | 6/1917 | Netherlands | 224/38 |
| 465073 | 8/1927 | Sweden | 224/37 |
| 86728 | 6/1936 | Sweden | 224/33 R |
| 119335 | 7/1947 | Sweden | 224/32 A |
| 621935 | 4/1949 | United Kingdom | 224/38 |
| 627463 | 8/1949 | United Kingdom | 224/32 A |
| 805454 | 12/1958 | United Kingdom | 224/32 A |

OTHER PUBLICATIONS

Spring Thing (Label For a Commercial Embodiment Of a Bike Rack); No Date Available.

*Primary Examiner*—Henry J. Recla
*Assistant Examiner*—Gregory Vidovich
*Attorney, Agent, or Firm*—C. Nessler

[57] ABSTRACT

A rotatable spring biased clamp for mounting on the platform of a bicycle rack pivots about the perpendicularly extending lugs ends of its legs. Each leg end is emgaged with a torsion spring that provides both a rotational force to the clamp, to hold objects on the platform, and a vertically bias on the lug ends, to hold them in place against the platform of a bicycle rack during use. The legs are elastically deformable toward each other, and coil type torsion springs have hook shaped tangs; the clamp is thus easily mounted on or removed from a rack platform without tools.

19 Claims, 3 Drawing Sheets

LOAD CLAMP FOR BICYCLE RACK

This is a continuation of patent application Ser. No. 08/307,144, filed Sep. 16, 1994, now abandoned.

TECHNICAL FIELD

The present invention relates to devices for carrying loads on bicycles and the like; in particular, to a type of rack which mounts above the rear wheel and has spring clamps for holding loads in place.

BACKGROUND

There are a variety of devices which facilitate carrying miscellaneous articles on bicycles. The marketplace has favored a metal rack attached above the rear wheel, to provide a generally horizontal platform surface. The rack typically has struts and brackets by which it is secured to the frame of the bicycle. See for example, the disclosures of U.S. Pat. No. 4,154,382 to Blackburn, U.S. Pat. No. 4,562,944 to Jackson et al., and U.S. Pat. No. 4,383,625, the disclosures of which are hereby incorporated by reference.

Sometimes, bags or baskets are attached to the rack platform to carry goods, as shown in the above mentioned Jackson et al. patent. Other times, closed containers may be mounted on or integrated into the rack. Quite frequently, the things which are carried are held on the rack by straps or elastic cords. The foregoing means have various disadvantages, including such as high initial cost, ineffectiveness, being subject to misplacement or loss when not in use, etc. Another manner of securing things to rack tops comprises so-called "rat trap" type devices, wherein one or more spring loaded metal brackets extends part way across the rack platform, to press the thing being held against the rack surface.

There are many simple bicycle racks already in use, and they continue to be sold with simple but inferior means for securing things to the platform. Thus, there is a need for a simple and low cost clamp for securing things to platforms; and especially, there is a need for a clamp that is adapted for retrofitting on presently installed rack products with minimal use of tools.

SUMMARY

An object of the invention is to provide a low cost and effective clamping device which can be readily attached to a bicycle rack without machining or the use of tools. Another object is the provide a clamping device which is simple, durable, and economic to manufacture.

According to the invention, a clamp for mounting on a bicycle rack platform is comprised of a clamp body that is pivotably mountable, so it presses rotatably down on the platform surface; the clamp is attached to the rack by means of spaced apart legs that have pivotable terminations, preferably sideways-extending lugs; the terminations are adapted to engage with the platform, preferably the side edge undersides, and to be the pivot points for the clamp body. Spring means act on the clamp body in proximity to the terminations when the clamp is mounted on a rack for use. The spring means attaches to the platform of the rack and provides a rotating bias force to the clamp, to hold articles on the platform surface. At the same time the spring means applies force to the termination at the clamp pivot end, so the termination presses firmly against the rack platform during use.

In a preferred embodiment there are two similar coil type torsion springs, one encircling each lug; the clamp is u-shape and the lugs extend sideways in opposing directions at the free ends of the u-shape. The legs extend through openings in the platform and the lugs engage with the platform underside at the opposing edges. And, the coil type torsion springs have opposing hook shape tangs; one tang removably engages the edge of the platform while the other tang likewise engages the leg of the clamp, to urge the clamp to rotate and to press the lugs upwardly against the platform underside. The legs of the u-shape clamp are elastically deformable toward and away from each other, so that during mounting and removal they may be deformed to better enable the lug ends to pass through openings in the rack platform.

Thus, the clamp can be installed on a rack and held in place without the use of tools, screws, etc. The clamp is readily adapted for retrofit mounting in the field on suitable racks without tools and machining; and, it is economic to manufacture.

The foregoing and other objects, features and advantages of the invention will become more apparent from the following description of the best mode of the invention and accompanying drawings.

DESCRIPTION

Figure 1:
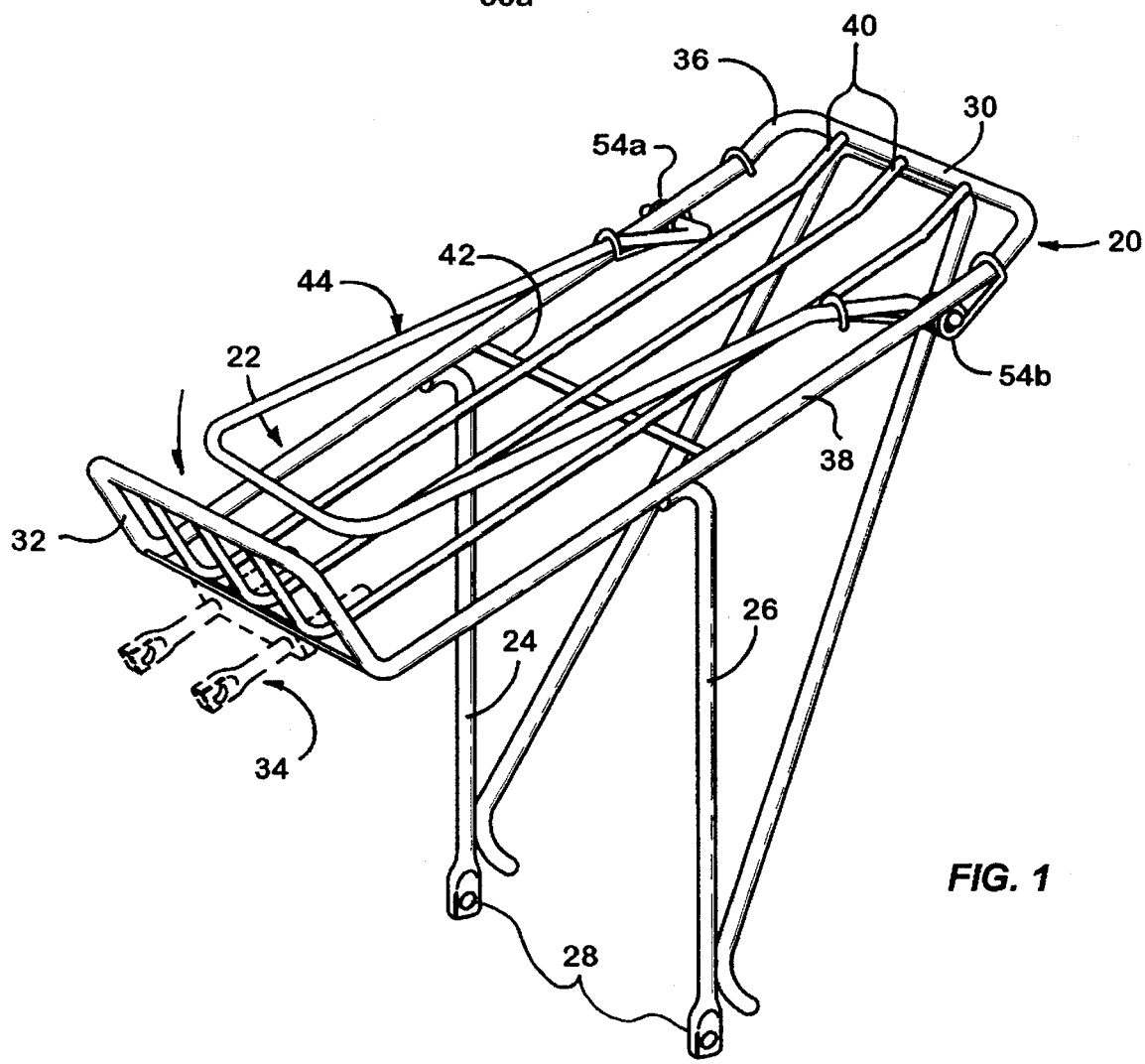
FIG. 1 is a perspective view of a bicycle rack having a clamp on the rack platform.

FIG. 1 shows a rack 20, generally of the configuration which is familiar in commerce. The rack 20, made of light gage welded aluminum rod, is comprised of a platform 22, generally horizontal during use, and a pair of downwardly extending struts 24, 26 having bolt holes 28 for attachment to the drop frame of a bicycle near the rear wheel. The rack has an upwardly tilted rear end 30 and front end 32. An adjustable attachment, such as longitudinally adjustable rod assembly 34 shown in phantom, extends from the platform front end, to enable securing of the rack platform to the bicycle frame in the vicinity of the bicycle seat.

The rack platform 22, having typical dimension of about 5-½ by 12 inch, is comprised of two spaced side edges running lengthwise, namely longitudinal rods 36, 38 of about ¼ inch diameter. They are joined by the opposing front end 30 and rear end 32. Smaller round rods 40 extend lengthwise along the platform, joined by cross member 42. Other rack and platform constructions, including sheet metal and extruded shapes, will be used within the invention.

The rack 20 has a u-shape clamp 44, pivotably attached in the vicinity of the rear end of the rack platform, in spring biased fashion, for pressing and holding an article onto the surface of the rack platform. The clamp is preferably made of about 3/16 inch diameter Type 6061T6 aluminum rod. As shown especially in FIG. 2, the clamp 44 is comprised of opposing parallel legs 46, 48 joined by end 50. FIG. 3 shows how the closed u-shape end 50a of a clamp may alternatively be configured with downward projections, portions 52a, to better capture a load.

Figure 2:
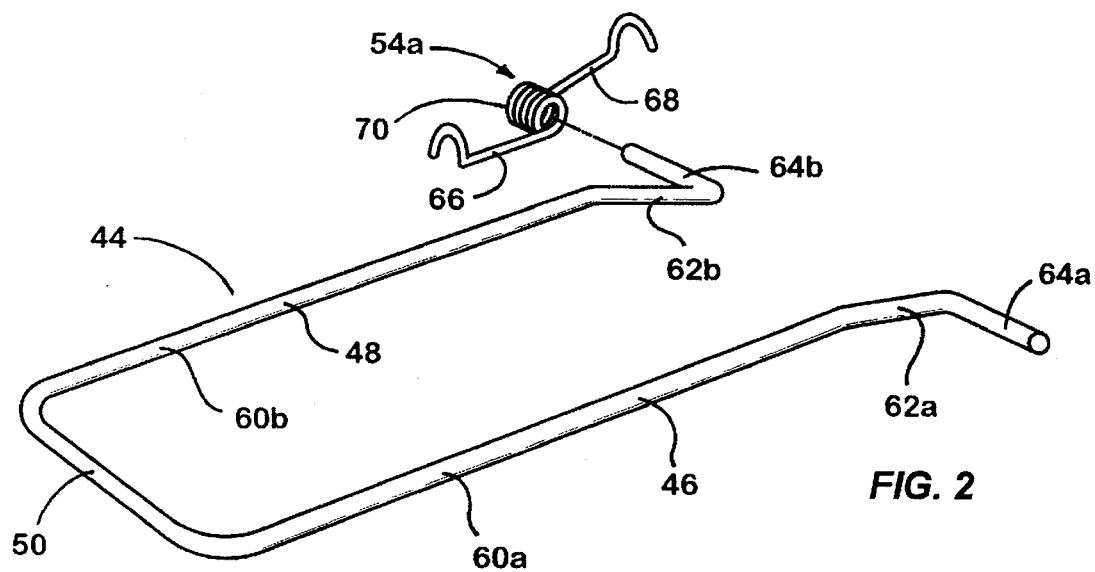
FIG. 2 is a perspective view of a clamp and a spring, part of the device shown in FIG. 1.
Figure 3:
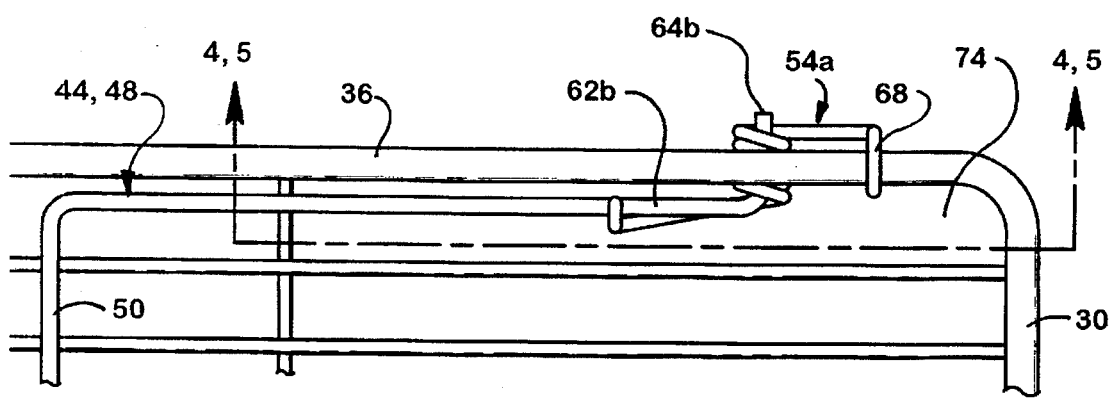
FIG. 3 is a partial top view of a corner of the platform and clamp shown in FIG. 1, showing how the clamp leg attaches to the platform outer edge by the spring.
Figure 4:
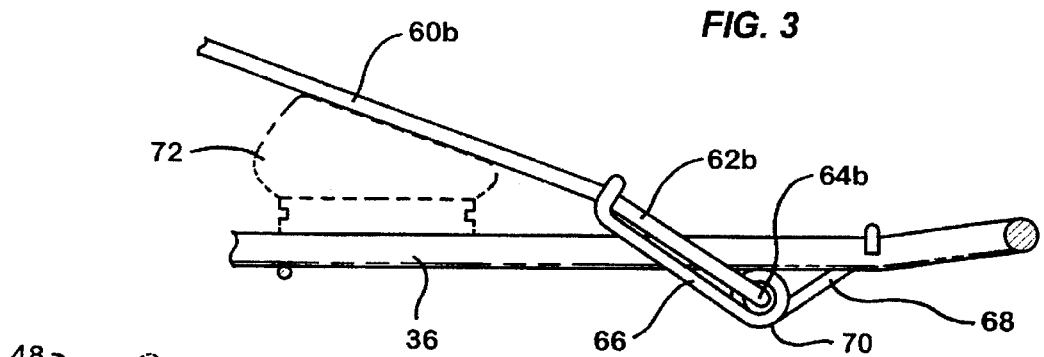
FIG. 4 is a side section view of the rack portion shown in FIG. 3 showing how the lug end of the clamp functions as a pivot point, being pressed vertically upward and held in place by the torsion spring.

The u-shape clamp legs have particularly shaped free ends, as especially illustrated by FIG. 2-4. With particular reference to FIG. 2, the main portion 60a of the typical leg 46 is straight. Near the free end of the leg 46 there is a short subsection 62a that lies in the same vertical plane as the main portion, but that forms a nominal 15 degree angle with the main leg portion. The bent subsection permits the clamp to lie parallel to and upon the surface of the platform in its rest position, when the leg free ends extend through the openings in the platform, to the underside. See FIG. 4 and 5. Attached at the outermost part of the free end of the leg is a lug 64a, extending sideways in a direction substantially perpendicular to the platform and clamp body length, and substantially perpendicular to the vertical plane containing the first portions 60a, 62a of the leg. The other leg 48 of the clamp has symmetrical like portions, 62b, 64b, as shown.

Figure 5:
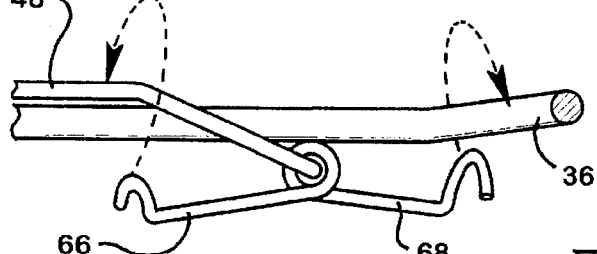
FIG. 5 is a fragmentary view of a clamp and platform showing how a user engages the torsion spring, to attach the clamp to the platform.

The u-shape clamp of FIG. 1 and 3 is spring biased and held on the rack platform by means of two coil type wire torsion springs 54a, 54b which circumscribably mount on the lugs 64a, 64b of the legs 46, 48. FIG. 2 shows a typical spring 54a dismounted from the lug. The spring has two hook shape tangs 66, extending in divergent directions from a circular coil body portion 70. FIG. 5 shows a typical spring mounted on the lug of a clamp leg 48 and illustrates how the tang 66 extends in the forward direction, to hook around the clamp leg 48, and how the tang 66 extends in the rearward direction, to hook around the platform part 36, thereby elastically tensing the spring. From the Figures it will be appreciated that the two torsion springs are similar in configuration, but with opposite direction hooks, for left and right mounting.

FIG. 3 shows a top view of typical spring 54a in its use position. FIG. 4 shows the rack somewhat raised and pressing downward on articles 72 shown in phantom. FIG. 4 also shows how raising the clamp torques the spring, as the tang 66 is pivoted upwardly by the raised leg lug 64. Upward motion of tang 66 is resisted by the spring action of the coil and by the counter-vailing force on tang 68 which presses against the rear end portion of the platform part 36.

Figure 7:
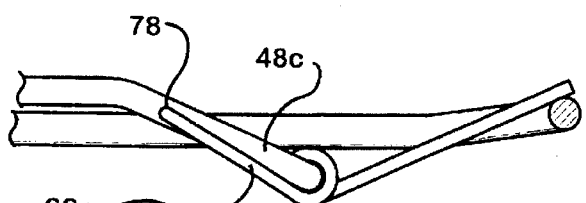
FIG. 7 is a fragment of an alternate embodiment of spring to leg attachment, where the spring is pinned to the leg.

From the foregoing description and Figures, it will be appreciated that clamp 44 can be attached and removed from the platform 30 readily. For removal, with reference to FIG. 3 and 4, the tang 68 may be manually lifted upward and outwardly from the platform outer edge 36; thus the free end of the clamp leg will now be able to move freely downward. The leg (and lug 64b) of the clamp is now pressed toward the centerlines of the clamp and rack platform, thus elastically distorting or closing the u-shape of the clamp. This is combined with optional small rotation of the clamp, so the leg translates along the length of the platform body within the opening 74. Thus, by cocking the clamp body, the lug end may be moved vertically through the opening 74 and then raised above the platform surface. In like fashion, the opposing leg 46 of the clamp can be released, and the whole clamp may be removed from the platform. The reverse motions, of course, will serve to install a clamp on a platform. For assemblies where the easy installation and removal are not required, other tang end features and attachment to the components may be used. For example, FIG. 7 shows how a hole 78 in the leg 66a of a clamp may receive a bent over tang end.

The spring configuration, including the orientation of the spring tangs about the spring body, is chosen so that when the clamp is in its rest position, lying against the platform surface, there will be sufficient downward force to hold thin articles and keep the clamp from rattling.

With reference to FIG. 4, the two upward forces from the opposing tangs 66, 68 urge the coiled body 70 of the spring and the encircled lug 64b vertically upward against the underside of the platform edge 36. The spring wire size and tang lengths are configured to accomplish the dual purposes of (a) providing rotational and downward clamping force that urges the clamp body toward the platform surface and (b) providing sufficient upward force on the coil body and lug to hold them in place against the underside of the platform. Said sufficient upward force causes the clamp to be frictionally engaged with the platform underside, and to stay longitudinally positioned, so the clamp can pivot about the lug during use, when the clamp body is manually raised. For any given desired rotational force on the clamp, when the tang lengths are shortened, the upward force on the spring body will be greater. Thus, the desired frictional force to hold the clamp pivot point in place can be obtained. For a preferred nominal 9-¼ inch long by 4-¼ inch wide clamp mounted on the rack platform as described herein, a preferred spring will be comprised of 0.100 inch dia spring steel; the seven turn coil will have an inside diameter of about ¼ inch; the tangs will each be about one inch long.

Figure 12:
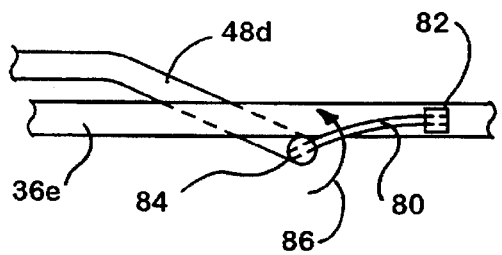
FIG. 12 shows an alternate embodiment of the lug-to-platform contact, where the spring is a leaf spring.

Other configuration mechanical springs may be used. For example, FIG. 12 shows how the lug end 84 of a clamp leg 48d is pressed in the desired rotational and upward directions (as indicated by the arrow 86) by means of a tensed leaf spring 90, firmly secured to the side edge 36e of a platform at lug 82. The lug will roll somewhat along the underside, but still will be substantially held in fixed position, to be a pivot point within the scope of the invention.

Generally, spring means are used. The term as applied here is intended to encompass different configuration and construction devices which provide the above-described combination of urging forces. For example, pneumatic actuators may be substituted.

Figure 6:
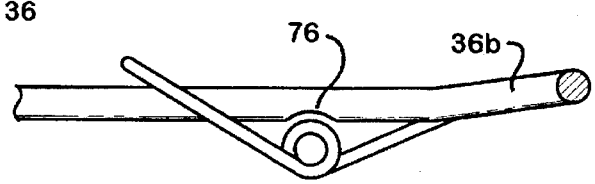
FIG. 6 is a fragment of an alternate embodiment platform outer member, showing how a spring coil circumscribing a lug fits into a depression on the bottom of the outer edge of a platform.

Thus, it should be appreciated that in the preferred embodiment when there are coil type torsion springs with hook ends, the clamp can be fitted to the platform of a rack which has no special adaptation to receive a clamp, and with no particular tools. When the platform is manufactured with the present clamp in mind, the underside of each outer member 36b may be fitted with a slight depression 76 to further aid longitudinal retention, as shown in FIG. 6.

As described for the preferred embodiment, the platform has round outer edge members. The invention can be applied to other platform configurations by suitable shaping of the end of the tang.

Figure 8:
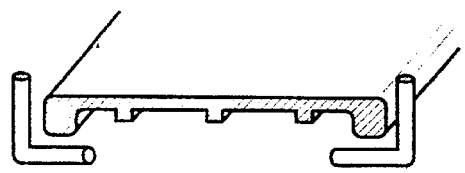
FIG. 8 is a width cross sectional view of a platform, showing an alternate embodiment of the clamp leg and lug ends.
Figure 9:
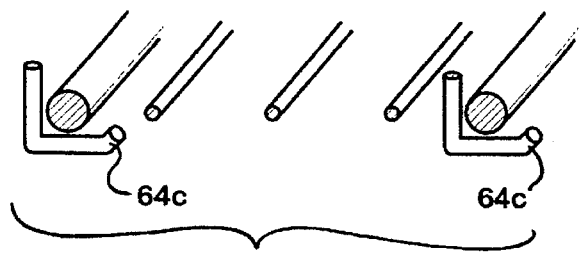
FIG. 9 is like FIG. 8, showing still another embodiment of lug ends and platform attachment.
Figure 10:
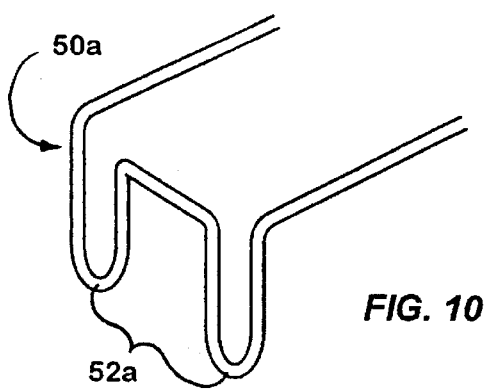
FIG. 10 shows an alternate embodiment of the closed end of a u-shape clamp, for better engaging articles on the platform.

The lug configuration may be different from that described above. For example, FIG. 8, showing a cross section across the width of a platform, illustrates how the legs may be outside the platform outer members. As FIG. 9 shows, in another embodiment, the lugs may face in the same direction, when suitable supplemental means such as the upward curve of lug ends 64c or other mechanical retentions are used. In both FIG. 8 and 9 the torsion springs are omitted for clarity.

Figure 11:
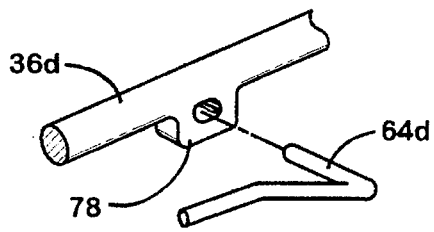
FIG. 11 shows an alternate embodiment of clamp mounting where one leg lug engages a pocket in a boss on the platform.

Clamps may be configured with only one spring within the general scope of the invention. FIG. 11 illustrates how one lug 64d of a clamp leg may engage a hole in a boss 75 attached to the underside of an outer member 36d of a platform, while the other leg may be configured and held in place by spring means. Similarly, the clamp may have different configurations than the u-shape tubular design which has been described, such as having more members, being solid, etc. See FIG. 15, for example. While the legs are preferably deformable in the plane of the u-shape as described, it will be evident that there will embodiments and platform configurations where they need not be deformable.

Figure 14:
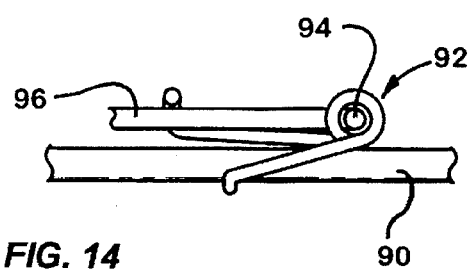
FIG. 13 and 14 show the pivot region for an alternate embodiment where the lugs of the clamp legs and associated coil type springs mount on the top of a platform.
Figure 13:
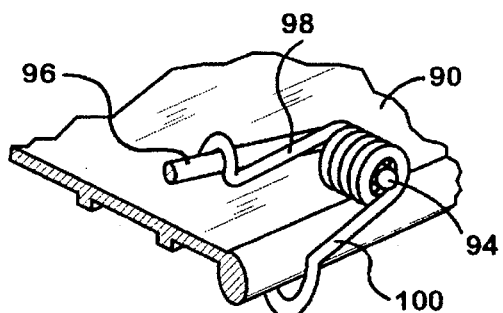

FIG. 13 and 14 show another embodiment of the invention which is useful when the platform 90 has no openings, such as when it is an extrusion. The coil type torsion spring 92 encircling the lug 94 engages the clamp leg 96 and urges it pivotably downward, in accord with the previous description. The spring 92 is configured, through its inherent manufactured bias and installation, to urge the lug downwardly onto the platform surface, when the clamp is at rest. When the clamp is raised, tang 98 resists unrolling from the coil; in such fashion is the clamping force produced. At the same time, when raising causes a slight translation of the lug along the platform surface, it produces a force at tang 100 which resists unrolling; such force is downward on the lug, so the lug remains the pivot point and in proximate contact with the platform surface.

Figure 15:
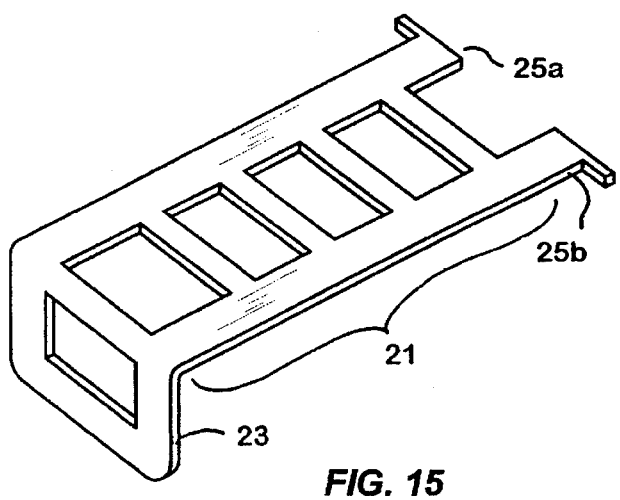
FIG. 15 shows an alternate embodiment clamp having a body with a projection at one end and short length legs at the other.

FIG. 15 shows another configuration of clamp. The clamp has a formed body portion 21, a downward projection 23, and legs 25a, 25b, extending from the body. FIG. 15 illustrates what is meant herein when reference is made to the clamp body and the legs extending therefrom, in connection with any clamp configuration, including the u-shape clamp. The legs in this embodiment are very short and in others they may be essentially comprised of just the lugs.

In still another embodiment, the coil type spring can be integrated into the leg structure to the leg and one tang are the same. For example, a u-shape clamp may be formed entirely from spring steel stock, and the leg ends can be coiled into torsion springs, with hook shape tangs extending for attachment to the platform. In such an embodiment the lugs referred to herein will essentially comprise or be intimately a part of the first turn of the coil spring.

Figure 16:
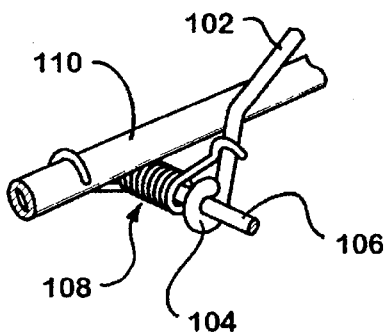
FIG. 16 shows a clamp leg having a loop end which pivots around a separate lug-rod.

Within the general mode of the invention, other structure may substitute for the lugs which are integral with the leg free ends. For example, as shown in FIG. 16, the typical leg 102 terminates in formed loop, to comprise the pivotable termination. Alternately the leg end may have a punched hole. The loop 104 circumscribes a loose lug-rod 106 which runs cross-ways underneath the platform to the opposite side. The coil type torsion spring 108 is mounted around the free lug rod, and the tang ends are connected to the clamp leg and platform edge 110; the spring provides the same kinds of forces to the elements as previously described.

Although only the preferred embodiment has been described with some alternatives, it will be understood that further changes in form and detail may be made without departing from the spirit and scope of the claimed invention.

I claim:

1. A removable clamp for mounting on a horizontal platform of a bicycle rack, the platform having a length, width, upper surface and lower surface, comprising:
   a clamp body having a length and a width;
   a first leg and a spaced apart second leg, both legs attached to and extending from the clamp body at one end thereof, each leg ending in a pivotable termination; and,
   a first spring, for flexibly connecting the pivotable termination of the first leg of the clamp body to the rack so the termination is in close proximity to one of the surfaces of the platform, when the clamp body length lies parallel to the platform length; the spring adapted to apply rotational and vertical force to said first leg when the clamp body is connected to the rack by the spring, said vertical force urging the pivotable termination of the first leg toward contact with the one surface of the horizontal platform;
   wherein, by overcoming resistance created by the spring, the pivotable termination is vertically movable relative to said one surface of the platform and horizontally slidable lengthwise along said one surface of the platform while remaining in close proximity therewith.

2. The clamp of claim 1 wherein the pivotable termination of each leg is a lug extending substantially perpendicular to the clamp body length.

3. The clamp of claim 2 wherein the spring is a coil type torsion spring, comprised of a coil body having first and second tangs extending from the opposing ends of the coil body, the spring mounted on the lug of said first leg so the spring coil circumscribes the lug, the first tang of the spring engaged with the clamp body, the second tang of the spring adapted for engagement with said rack.

4. The clamp of claim 3 comprised of a second coil type torsion spring mounted on the lug of the second leg in the same manner as the first spring.

5. The clamp of claim 3 wherein the spring has a hook shape second tang, for easy engagement and disengagement from the rack.

6. The clamp of claim 2 wherein the legs are elastically deformable relative to each other, to facilitate installation and removal of the clamp for the rack.

7. The clamp of claim 2 wherein the lug of the first leg faces in an opposing direction to the lug of the second leg.

8. The clamp of claim 1 wherein the clamp body has a u-shape, said legs extending from the free ends of the u-shape.

9. Apparatus for carrying articles on a bicycle comprising:
   a rack, having a platform and means for attachment to the bicycle, wherein the platform lies in a substantially horizontal position during use;
   the platform having a top for supporting articles, a length, a width, an upper surface, a lower surface; and, opposing side edges extending along the length;
   a clamp having a clamp body, a portion of the clamp body positioned above the top surface of the platform, for rotating downwardly to hold articles on the platform, the clamp body having a length and a width corresponding in alignment to the length and width of the platform;

a first leg and a spaced apart second leg, attached to and extending from one end of the clamp body generally in the same direction as the clamp body length, at least one of said legs pivotably attached to the platform by a spring means; each of said legs having a free end terminating in a lug extending substantially perpendicular to the clamp body length and in the direction of the clamp body width, each lug lying in proximity to an opposing side edge of the platform, each lug in close proximity to one of the surfaces of the platform near the side edge;

spring means, connecting the lug of the first leg to the side edge of the platform to which it is proximate, the spring means applying rotational force and vertical force to the first leg, said forces urging the leg and clamp body to rotate about the lug and simultaneously urging the lug into proximity to said one surface of the platform;

wherein, said spring means vertical force is necessary to maintain the first leg lug in close proximity to said platform one surface; and, wherein the first leg lug is horizontally movable along the platform in the lengthwise direction while remaining in close proximity to said one surface, by overcoming forces created by the spring means.

10. The apparatus of claim 9 wherein the lug is positioned proximate the bottom surface of the platform side edge and wherein the spring means urges the lug upwardly against the bottom surface of the platform.

11. The apparatus of claim 10 wherein the spring means comprises a coil type torsion spring comprised of a coil body having first and second tangs extending from the opposing ends of the coil body, the torsion spring mounted on the lug of said first leg so the coil body circumscribes the lug, the first tang of the spring engaged with the clamp body, the second tang of the spring engaged with the platform.

12. The apparatus of claim 11 comprising an additional similar torsion spring mounted on the lug of the second leg in the same manner as the spring mounted on the first leg.

13. The apparatus of claim 12 wherein the second tang of each spring has a detachable hook end engaged with a side edge of the platform.

14. The apparatus of claim 13 wherein the spaced apart legs are elastically deformable relative to one another, to facilitate installation and removal of the clamp from the platform.

15. The apparatus of claim 9 wherein the lugs of the respective clamp legs extend in opposing directions.

16. The apparatus of claim 9 wherein the platform has a top surface with openings adjacent said platform side edges, the free ends of the legs extending lengthwise through the openings, the openings having sufficient dimensions to enable the lug ends of the legs to pass there-through.

17. The apparatus of claim 9 wherein the clamp has a u-shape, said one end of the clamp body comprising the open end of the u-shape.

18. The apparatus of claim 9 wherein each leg has a leg subsection proximate the lug thereof, the subsection lying at an angle to the length of the clamp body.

19. Apparatus for carrying articles on a bicycle comprising:

a rack, having a platform and means for attachment to the bicycle, so the platform is in a generally horizontal position during use;

the platform having a top surface for receiving articles, a bottom surface, a length, a width and opposing side edges extending along the length; the platform surface having at least two spaced apart openings, each opening adjacent an opposing side edge;

a clamp pivotably engaged with the platform, comprising a clamp body positioned above the top surface of the platform, for rotating downwardly to hold articles thereon, the clamp body having a length and a width aligned with the length and width of the platform;

the clamp having a first leg and a second leg, the legs attached to, extending from, and running generally parallel to the length of, the clamp body; each leg having a free end, one of each leg free ends passing through one of each said openings in the platform surface, to the vicinity of the bottom surface of the platform;

each of said leg free ends having a lug extending substantially perpendicular to the clamp length, the lug of the first leg facing oppositely to the direction of the lug of the second leg, each lug positioned closely proximate to the bottom surface of the platform at the side edges thereof;

a first spring of a coil torsion type, mounted on the lug of the first leg to flexibly connect the lug to the platform; the spring comprised of a coil body having first and second tangs extending from the opposing ends of the coil body, the first spring mounted on the lug of the first leg so the spring coil circumscribes the lug, the first tang of the spring pressing against the first leg, the second tang of the spring pressing against the side edge of the platform, the spring applying vertical force and rotational force to the clamp leg, for urging the clamp body to rotate about the lug and simultaneously applying force to urge the lug upwardly toward the bottom surface of the platform where the first leg lug is positioned, so the lug functions as the pivot point for the clamp body; and, a second spring of a coil torsion type mounted on the lug of the second leg, configured and functioning similarly to said first spring mounted on the lug of the first leg;

wherein said lugs are connected to the platform only by said springs; and, wherein said vertical spring force is required to maintain said lugs in close proximity to the bottom surface of the platform.

* * * * *